March 7, 1961  A. PELTZER, SR  2,973,896
CENTRIFUGE APPARATUS
Filed Jan. 19, 1956  6 Sheets-Sheet 1
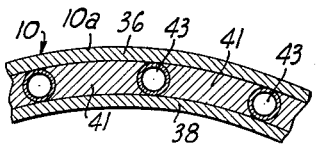
FIG_2_
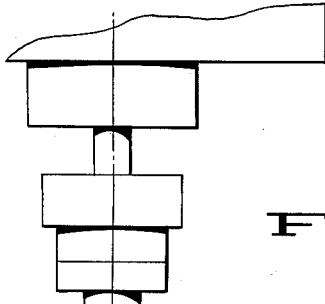
FIG_1_
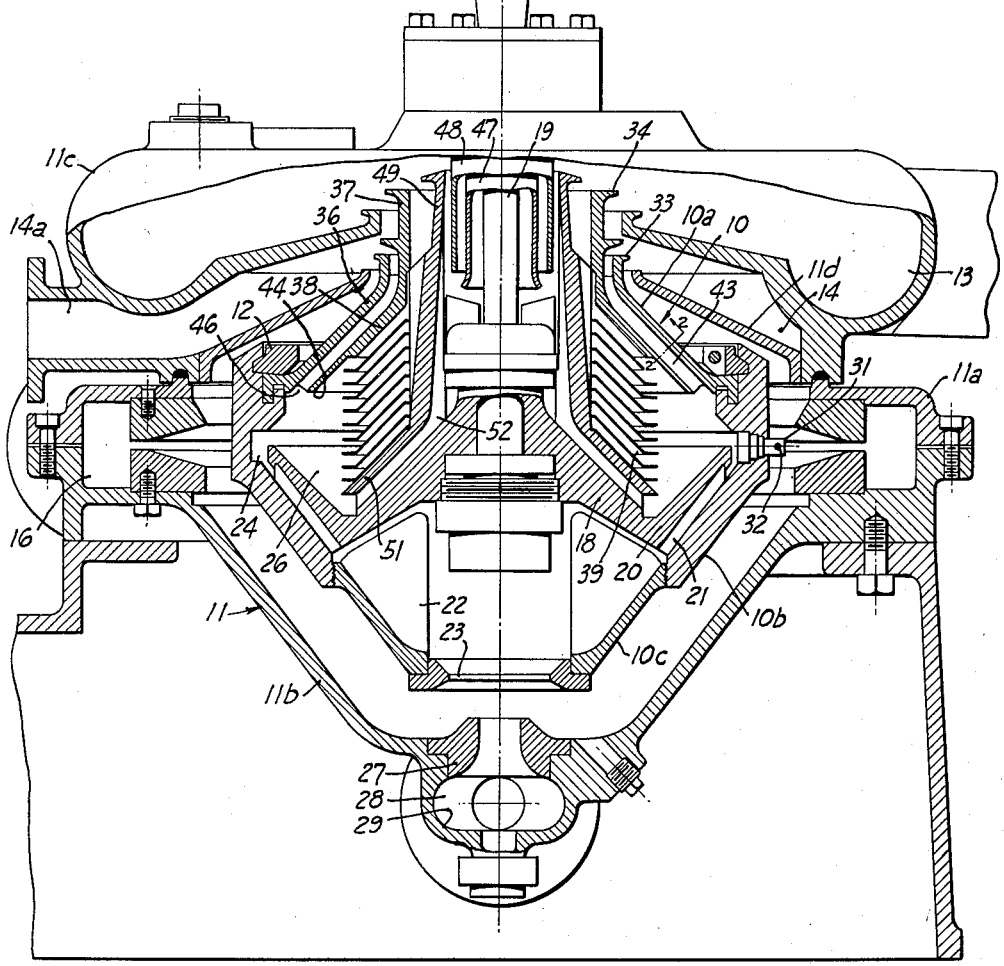
INVENTOR.
Albert Peltzer, Sr.
BY
ATTORNEYS

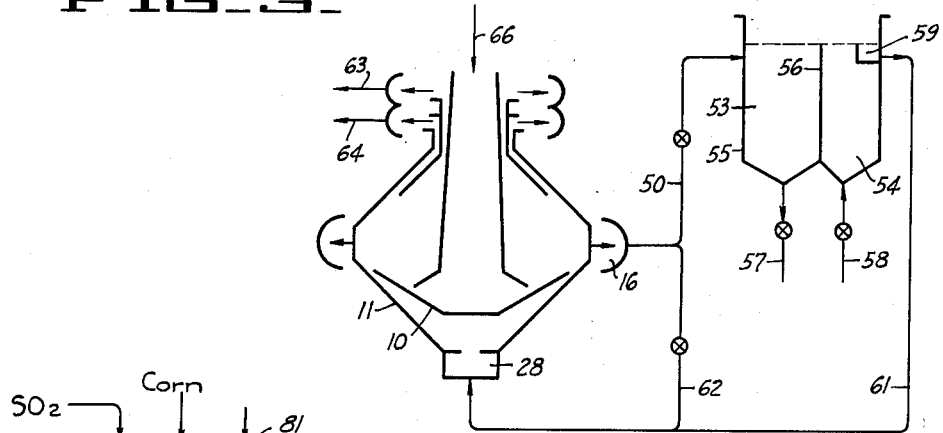
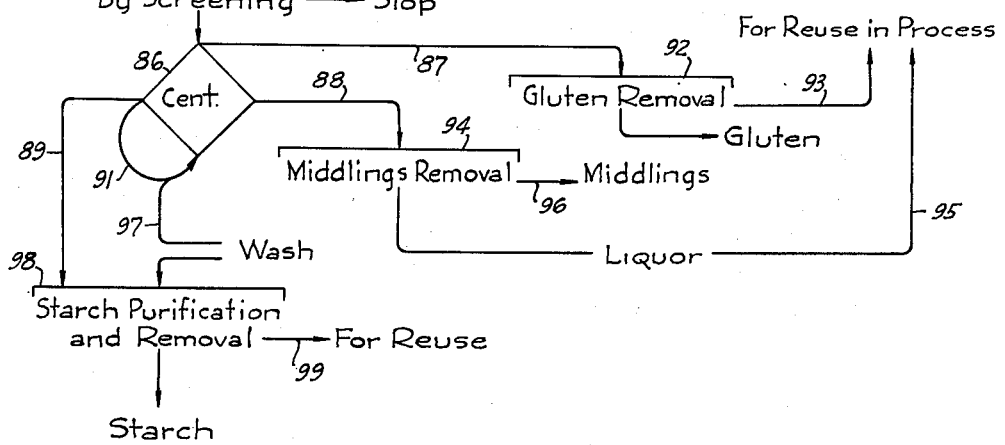

March 7, 1961 A. PELTZER, SR 2,973,896
CENTRIFUGE APPARATUS
Filed Jan. 19, 1956 6 Sheets-Sheet 3
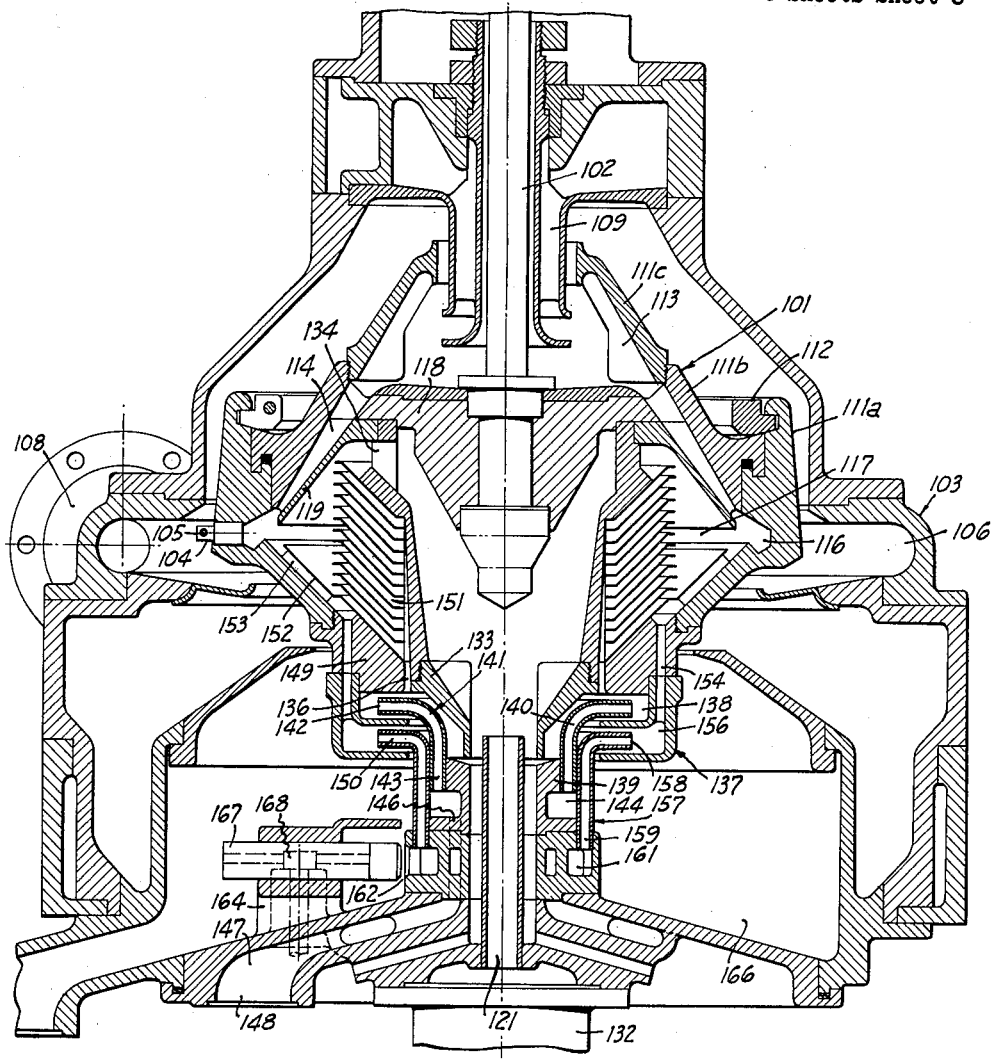
FIG_5_
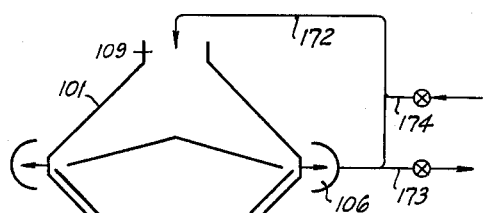
FIG_6_
INVENTOR.
Albert Peltzer, Sr.
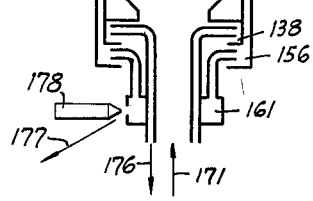
ATTORNEYS

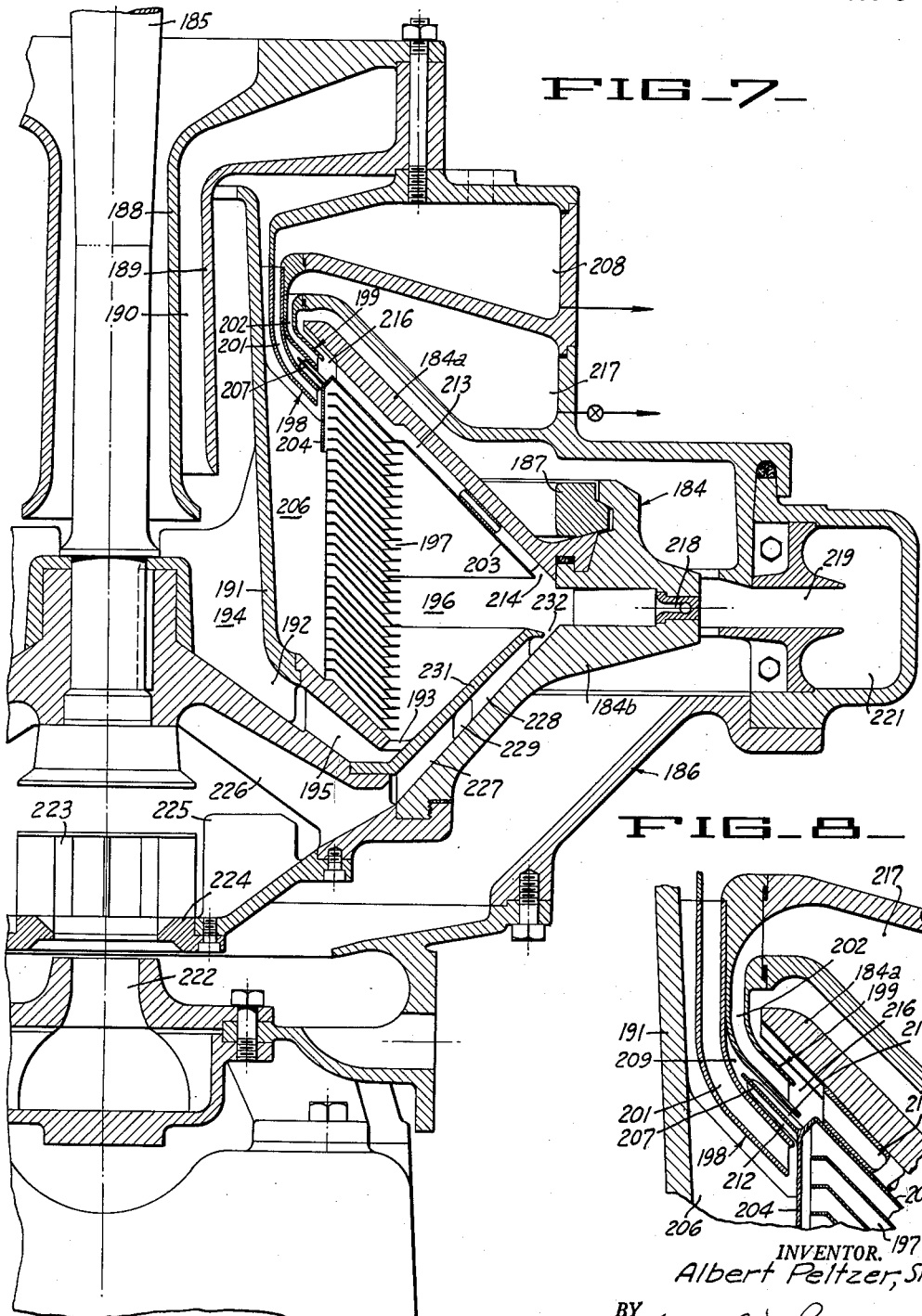

March 7, 1961 A. PELTZER, SR 2,973,896
CENTRIFUGE APPARATUS
Filed Jan. 19, 1956 6 Sheets-Sheet 5
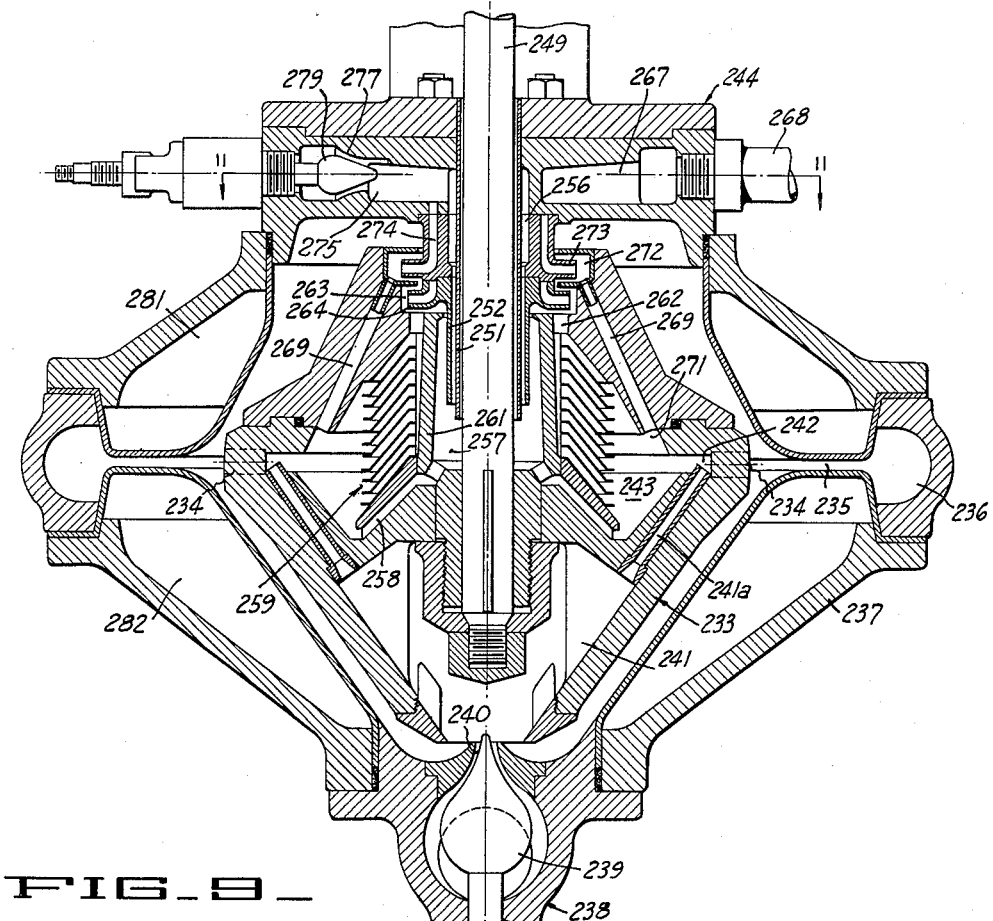
FIG_9_
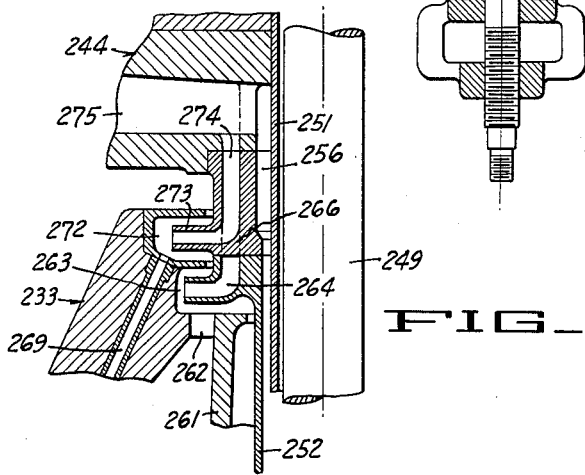
FIG_10_
INVENTOR.
Albert Peltzer, Sr.
BY
ATTORNEYS March 7, 1961 A. PELTZER, SR 2,973,896
CENTRIFUGE APPARATUS
Filed Jan. 19, 1956 6 Sheets-Sheet 6
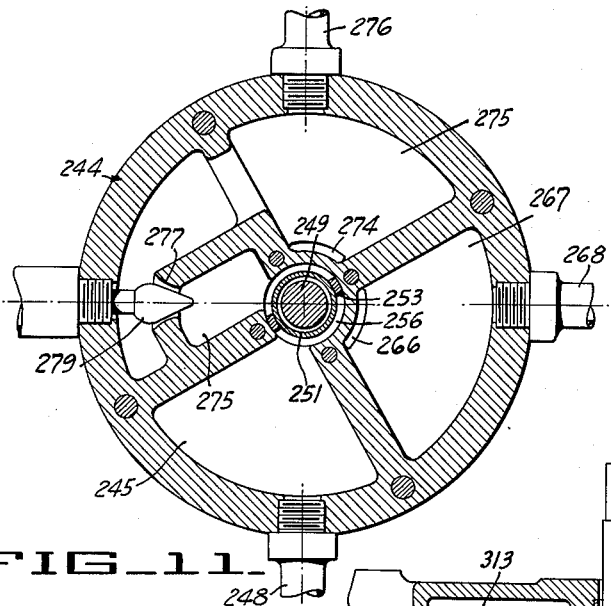
FIG_11_
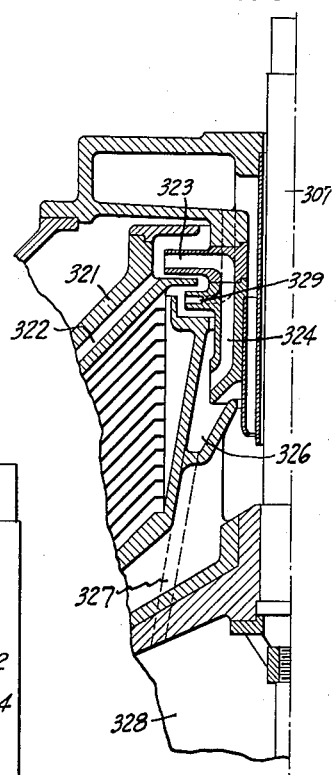
FIG_13_
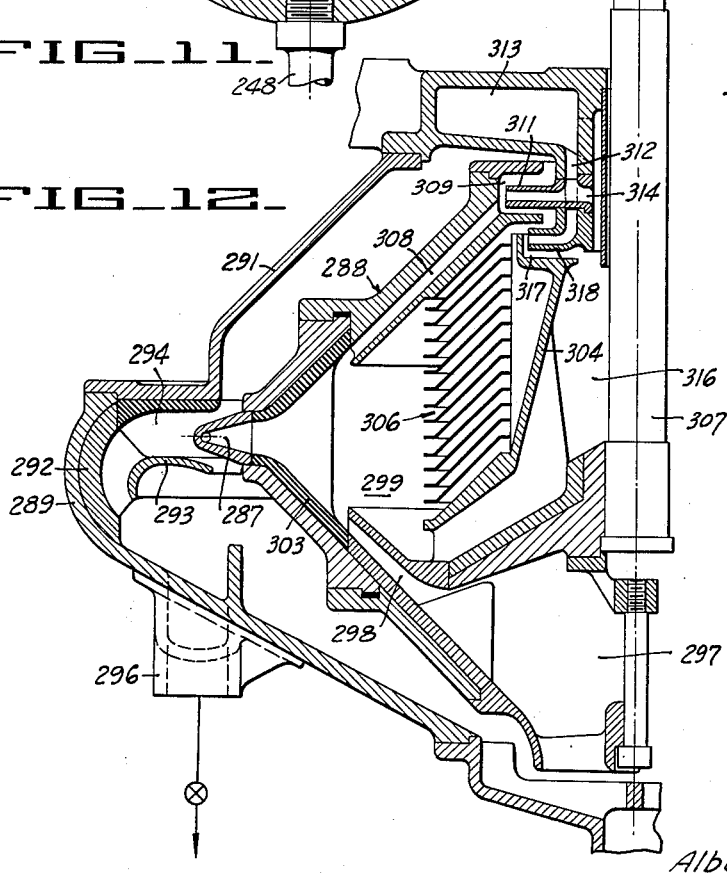
FIG_12_
INVENTOR.
Albert Peltzer, Sr.
BY
ATTORNEYS

United States Patent Office 2,973,896
Patented Mar. 7, 1961

2,973,896

CENTRIFUGE APPARATUS

Albert Peltzer, Sr., San Francisco, Calif., assignor, by mesne assignments, to Dorr-Oliver Incorporated, Stamford, Conn., a corporation of Delaware Filed Jan. 19, 1956, Ser. No. 560,152

14 Claims. (Cl. 233—19)

This invention relates generally to centrifuge machines such as are applicable for performing various separating operations on fluid feed materials. This application is a continuation-in-part of my copending application Serial No. 216,357, filed March 19, 1951, and entitled "Starch Manufacturing Process Including Centrifugal Removal of "Middlings, now Patent No. 2,760,889.

Continuous centrifuges of the type disclosed in Letters Patent Nos. 1,923,454, 1,945,786, 2,525,629, 2,559,453, 2,616,620, and 2,625,321 are constructed to discharge two centrifugally separated fractions referred to as the underflow and overflow. A part of the underflow can be continuously returned into the centrifuge rotor to minimize blocking of the underflow nozzles, and to obtain other benefits. Such machines have been widely used for various industrial separating operations, as for example in the starch industry for the separation of starch from gluten. While such machines are effective and satisfactory for many applications, there are some instances where the underflow contains not only the desired heavier solid material, such as starch, but in addition solid material which is undesired, and which may require additional processing operations for its removal. It is not feasible to adjust the machines to throw the bulk of such solids into the overflow, because this interferes with effective separation of the desired underflow solids, and in addition it may cause undesired contamination of the overflow. The undesired solids in the underflow may be of a type of fibrous material closely associated with starch. In addition to the fact that such solids in the underflow may cause undesired contamination, the presence of such material may cause operating difficulties, such as clogging or blocking of the separating chamber.

In general it is an object of the present invention to provide a continuous centrifuge apparatus capable of discharging two centrifugally separated underflows, together with an overflow. The second underflow may contain a solid material which otherwise would contaminate the underflow, as explained above.

Another object of the invention is to provide a continuous centrifuge apparatus characterized by the use of a return circuit built into the rotor of the machine, and which operates without excessive power consumption.

Another object of the invention is to provide an apparatus of the above character which is capable of a wide latitude of adjustment to suit various separating requirements.

Additional objects and features of the invention will appear from the following description in which the preferred embodiments of the invention have been set forth in detail in conjunction with the accompanying drawings.

Referring to the drawings:

Figure 1 is a side elevational view in section illustrating a centrifuge incorporating the present invention.

Figure 2 is a cross-sectional detail on an enlarged scale illustrating the construction of the tubes 43 for removal of the second underflow.

Figure 3 is a schematic view illustrating the machine in Figure 1, together with parts incorporated in an external return circuit.

Figure 4 is a flow sheet illustrating a process which can be carried out by use of the machine shown in Figure 1.

Figure 5 is a side elevational view in section illustrating another embodiment of the invention.

Figure 6 is a schematic view illustrating operation of the machine shown in Figure 5.

Figure 7 is a side elevational view in section illustrating another embodiment of the invention in which the return circuit is incorporated for the second underflow drawoff.

Figure 8 is a cross-sectional detail on an enlarged scale illustrating the construction of the overflow discharge device 198 and the second underflow discharge device 199.

Figure 9 is a side elevational view in section illustrating another embodiment of the invention.

Figure 10 is an enlarged detail showing parts of the machine shown in Figure 9 which handle the second underflow.

Figure 11 is a cross-sectional detail showing compartments and associated parts for the upper structure 244.

Figure 12 is a half side elevational view in section illustrating another embodiment of the invention in which there is an internal return circuit for the second underflow.

Figure 13 is a view like Figure 10 but showing another embodiment.

The centrifuge illustrated in Figure 1 consists of a rotor 10 disposed within the housing 11. The body of the rotor can be formed of the conical shaped sections 10a and 10b which are held together by the clamp ring 12.

The housing can be formed of a plurality of sections, including the main sections 11a and 11b. Upper sections 11c and 11d of the housing are formed to provide the annular chambers 13 and 14, which serve to receive an overflow and an underflow being discharged from the rotor. The main housing sections 11a and 11b are formed to provide means to receive underflow material in the form of a volute passage 16, which surrounds the main part of the rotor, and serves to collect an underflow being discharged from the periphery of the rotor. The chambers 13 and 14 and volute passage 16 are each connected with suitable outlet pipes for withdrawing the separated fractions. As will be presently explained, a large part of the material received in the volute 16 is continuously returned back into the rotor.

The lower part 10c of the rotor forms in effect an impeller to facilitate the return of underflow material. Thus within the rotor there is a member 18 which is mounted upon the lower end of the vertical drive shaft 19. Member 18 carries a conical shaped skirt 20 that is spaced from the adjacent wall portion of the rotor part 10b by radially extending ribs 21. Additional radial extending vanes 22 extend downwardly below member 18, and serve to act upon material which may be discharged upwardly into the impeller, through the lower impeller opening 23. Material discharged outwardly by the impeller is delivered into the outer portion 24 of the separating chamber 26.

Below the rotor and mounted upon the housing, there is a nozzle 27, the orifice of which communicates with the liquid space 28, formed in the casting 29. Chamber 28 is in communication with a pipe which in turn connects with the volute 16 for return of a large portion of the underflow material.

The centrifuge of Figure 1 is constructed to provide two underflow drawoffs, together with the centrifugally separated overflow. Of the two draw-offs a first underflow drawoff is from the outer periphery of the separating chamber, and by way of the peripheral discharge nozzles 31. These nozzles can be provided with backwardly directed discharge orifices 32. The nozzle construction may be as disclosed and claimed in U.S. Patent No. 2,060,239. The second underflow occurs over the weir 33, and the overflow occurs over weir 34. Weir 33 is formed at the upper end of a sleeve-live extension 36, which is carried by the rotor body part 10a. Weir 34 is formed at the upper end of a sleeve-like extension 37, which is carried by the conical member 38. Conical member 38 is disposed in the upper part of the rotor and immediately above the separating disc assembly 39. It is spaced from the adjacent wall of the rotor body by segmental filler blocks 41, which in turn extend between the radially extending tubes 43. Secondary underflow material flows through the tubes 43, and then upwardly within the sleeve extension 36, to discharge over the weir 33. Before entering the tube 43 material from the separating chamber must flow past the outer peripheral edge 44 of member 38 and into the annular pocket 46, and thereafter the material enters the relatively restricted passages through the tubes 43. The location of the annular edge 44, the number and size of tubes 43, and the diameter of weir 33 are factors determining the character of the underflow material discharging over the weir 33. The annular space 46 is somewhat isolated from the main separating chamber and serves to transfer the flow of underflow material from the separating chamber to the inlet ends of the tubes 43.

It will be noted that the flow through tubes 43 is radially inward, and is therefore opposed to the centrifugal effect exerted on the material passing therethrough. According to the present invention the number of tubes, their cross section and the diameter of the weir 33, are made commensurate with the amount of liquor desired to pass therethrough. With the proper proportioning the flow through the tubes is of such velocity as to prevent settling out of solid material therein. More specifically the flow can be sufficiently rapid to prevent separating out of solid material by virtue of the centrifugal effect being exerted upon the same. In other words with proper proportioning the fibrous or other solid material congregating in the more or less cylindrical zone about the peripheral edge 44 and entraining in the annular pocket 46, is carried through the tubes 43 with the rapid flow of liquor, and against the centrifugal effects being applied to the same. In this connection it will be noted that according to the present invention, and as illustrated in Figure 1, the solids being discharged from the machine in the second underflow are withdrawn from the separating chamber of the rotor in a localized zone where such solids congregate.

All of the second underflow discharged through the tubes 43 passes over the weir 33 into the chamber 14. From this chamber the material can be withdrawn by way of the flanged outlet pipe 14a. Weir 34 discharges into a chamber 13, which is likewise provided with a suitable outlet pipe.

The feed material is introduced through the space between the tubes 47 and 48, which are disposed concentrically about the shaft 19. At the lower ends of these tubes the feed material is received within the member 49, which at its lower end carries a conical skirt 51 underlying the separating discs 39. Radially extending vanes 52 serve to apply rotary velocity to the feed material and to deliver the same into the separating chamber.

Above the housing suitable bearing means is provided for supporting the shaft, and the shaft is connected with motive means for rotating the same at the desired speed of rotation.

Figure 3 diagrammatically illustrates a return circuit for the machine thus described. In this instance a pipe 50 connects to the volute passage 16 and delivers this material into the vent box or flotation cell 55. This box can be divided into the two compartments 53 and 54 which are separated by weir 56. Underflow material which is to be withdrawn from the system can be removed from compartment 53 by way of pipe 57. Wash water can be added by way of pipe 58. An overflow launder 59 is connected by pipe 61 back to the centrifuge rotor. This represents the line which connects with the liquid chamber 28 at the lower end of the centrifuge housing. If desired the vent box 55 can be by-passed through the pipe 62. Lines 63 and 64 of Figure 3 represent the overflow and the second underflow respectively, and line 66 represents the feed material.

The machine described above can be used in a wet cornstarch process, and more particularly in a primary separating operation for the removal of starch from gluten. By use of the two underflow drawoffs, so-called middlings can be centrifugally separated from the starch and withdrawn in the second underflow, thus greatly reducing the contamination of the starch underflow.

The flow sheet of Figure 4 illustrates a simplified process in which corn is shown being supplied to the conventional steeping operation 81, which is carried out at an elevated temperature of the order of 120° F., and with introduction of sulphur dioxide. Water added for steeping is taken from subsequent steps of the process. At the end of the steeping operation liquor is drained from the corn and may be sent to evaporators for the manufacture of a valuable by-product. Steeped material is subjected to cracking at 82 to release germs, after which it is treated to germ removal at 83. The germ removal can be carried out according to conventional methods, involving floating off the germs, and washing the germs to remove starch therefrom. The material from operation 83 is subjected to grinding at 84, which is generally carried out by mills of the "Buhr" type. Here the starch grits are ground to sufficient fineness for the subsequent primary separating operation. The material obtained from the grinding operation 84, together with any starch bearing liquor that may be withdrawn directly from operation 83, is then subjected to a series of screening operations for the removal of both "fine" and "coarse" fiber, as indicated at 85. The magma resulting from the operations described above is commonly referred to in the industry as mill starch, and contains primarily starch particles, gluten, dissolved solids referred to as solubles, and middlings. Such middlings may be defined as solids of a fibrous nature which tend to be detrimental to the finished starch, and which appear to be attached to or closely associated with the starch. They are difficult to remove in ordinary wet milling operations, including the screening employed in the conventional fine and coarse slop systems. The mill starch in Figure 4 is shown being supplied as a feed to the centrifuge 86. Preferably it is at a Baumé of about 6 to 12, and if at a lower Baumé it may be subjected to a dewatering operation prior to introducing it into the centrifuge.

Line 87 extending from the centrifuge represents the overflow drawoff, line 88 the second underflow containing the middlings, line 89 the first or starch underflow drawoff, and line 91 the return circuit (with or without a vent box) for continuously returning underflow material into the rotor. The amount of material being returned by way of line 91 will ordinarily be several times the rate of withdrawal by way of line 89. Thus of the total material discharged from nozzles 31, as much as ninety parts or more can be returned by way of line 91, and the remainder withdrawn by line 89. The gluten overflow 87 is shown being treated at 92 for removal of gluten, and the process water thereby obtained is shown being returned to the process by line 93. Gluten removal can be carried out by conventional procedures, such as settling, filtration or combinations thereof.

The second underflow 88 is shown being treated at 94 for removal of its fiber, thus providing further wash liquor which is likewise shown being returned to the process by line 95. Line 97 represents introduction of a wash into the return circuit 91 to facilitate displacement of gluten and solubles from the starch carried out in the underflow 89. Line 96 represents removal of starch contaminated fibrous material from the system. There are various ways in which one may dispose or make use of such fibrous material.

The starch drawoff 89 is shown being further treated at 98 for the purification and removal of the starch. Conventional methods can be used for this operation, including starch filters on which the starch is washed one or more times with fresh water for further removal of colloidal gluten and solubles. The finished starch is then processed according to customary practice. Liquor or effluent 99 derived from operation 98 is available for use back in the process as indicated. A part of the effluent from operation 98 can be used as the wash 97 in sufficient quantity to cause an upflow toward the second underflow discharge, while permitting a downflow condition in the zone surrounding the separating discs 39.

In the process described above (Figure 4), the centrifuge operates continuously to effect primary separation between starch and glutens, and two underflows are continuously discharged, of which the first contains the desired starch, and the second contains the bulk of the so-called middlings. The construction of the apparatus, and its method of operation, makes it possible to maintain both conditions of upflow and downflow. Thus assuming that the amount of wash 97 is in excess of the amount of water withdrawn with the starch in underflow 89, a part of the wash thereby introduced into the centrifuge flows countercurrently from the annular chamber portion 24 to the annular zone 46, to be discharged through the tubes 43. Such countercurrent flow of wash produces what may be termed an upflow condition. Any part of the wash which is introduced into the rotor together with the return circuit load, and which does not pass through the tubes 43, is relatively minor compared to the amount of water contained in the feed to the machine. Therefore in that part of the rotor extending inwardly of the peripheral edge 44, downflow conditions can be maintained while maintaining upflow for the outer part of the rotor. The feature just described is radically different from a conventional continuous centrifuge having provision for the discharge of a single underflow, together with an underflow return circuit into which wash liquor is introduced. With such a machine, when sufficient wash is introduced into the return circuit to establish upflow conditions, the upflow is maintained throughout the separating chamber, whereby the amount of liquid introduced by way of wash which exceeds the amount of liquid being removed in the underflow drawoff, passes from the machine by way of the overflow.

The centrifuge arrangement incorporated in Figure 4 may be substantially as illustrated in Figure 3. It is desirable for the drawoff from the first underflow return circuit to be controlled by a suitable control valve, thus permitting maintenance of desired separating conditions. In general for given operating conditions, with a fixed rate of feed, a reduction in the rate of drawoff from the first underflow circuit has the effect of reducing the percentage of residual middlings in the first or starch underflow, increasing the percentage of starch in the second or middlings underflow, and increasing the gravity of the material withdrawn from the first underflow circuit. Thus it is desirable to adjust the drawoff of starch to enable a desired separating performance, with the underflow drawoff materials being of such a character as is desired for the system involved.

Figures 5 and 6 illustrate another embodiment of the centrifuge in which feed material is introduced into the lower end of the same, and the upper end of the machine constructed to receive returned underflow material. Such a machine is in some respects similar to that illustrated in Figure 3 of Peltzer U.S. Patent No. 2,323,077, although in the present instance the machine is provided with means for the withdrawal of two underflows, the same as the machine of Figures 1 to 3, inclusive. In general the machine of Figures 5 and 6 includes a rotor 101 which is carried by the vertical shaft 102, and which is enclosed within the housing 103. The rotor is provided with peripheral discharge nozzles 104 which have backwardly directed discharge orifices 105. An annular volute 106 is formed as a part of the housing and is disposed to receive material from the discharge nozzles 104.

A conduit 108 communicates tangentially with the volute 106 and connects with an external return circuit whereby first underflow is continuously returned back into the centrifuge rotor through the upper passage 109. The first or starch underflow withdrawn from the centrifuge can be diverted from the return circuit, and wash water can be introduced into the return circuit at a controlled rate.

The rotor is formed of the sections 111a, 111b, which are secured together by the clamping ring 112. Another rotor section 111c forming the upper part of the rotor, receives the first underflow material discharging downwardly through the passage 109. The interior of the rotor section 111c is provided with the vanes 113, which give rotary velocity to the returned material, and cause this material to be discharged outwardly through the passages 114, and from thence into the outer part 116 of the separating chamber 117.

A structure 118 is mounted upon the lower end of shaft 102, and carries a conical shaped skirt 119, which together with rotor section 111b, defines the passages 114.

For the introduction of feed material a nozzle 121 (Figure 5) extends upwardly into the lower end of the rotor, and connects with the oversize screen fitting 132. The conical shaped member 133 into which the feed material is delivered is provided with radially extending passages 134 for delivering the feed material into the separating chamber 117.

The rotor is also provided with means for discharge of one overflow and two underflows. Thus immediately surrounding member 133, the lower end of the rotor is formed to provide the overflow weir 136. A structure 137, which is mounted upon the lower end of the rotor, is formed to provide the annular trough 138 to receive material from the weir 136. An annular member 139 is carried by the lower part of the housing and supports a discharge device 141. This device has an outwardly extending annular portion 142 disposed within the trough 138. The discharge device 141 affords a passage 143 which delivers overflow material into the annular space 144, and from thence through passages 146 and 147 to the discharge 148.

Within the lower part of the centrifuge chamber an inverted conical shaped member 149 underlies the separating discs 151, and the space between member 149 and the adjacent wall of the rotor is occupied by the segmental spacing blocks 152, between which are the radially extending tubes 153. The inner ends of the tubes 153 communicate with the downwardly extending tubes 154, which in turn discharge into a trough 156 formed in the structure 137. A discharge device 157 has an outwardly extending annular portion 158 which is disposed within trough 156. The passage 159 in discharge device 157 delivers material into the annular chamber 161, which communicates through the passage of valve seat 162 with the passage 164, whereby the second underflow is delivered into the receiver compartment 166. The flow of second underflow material through valve seat 162 can be regulated by adjusting the position of the valve member 167, which for example can be moved inwardly or outwardly by turning the pinion 168. The regulation must be within the limits determined by the flow through the tubes 153. The compartments 166 and passage 148 can connect with pipes (not shown) for withdrawing the underflow and overflow materials.

Both discharge devices 141 and 157 have vanes 140 and 150, the outer ends of which are curved in a direction opposite to the direction of rotation of the rotor whereby such vanes direct material inwardly and through the passages 143 and 159.

Figure 6 schematically illustrates the machine of Figure 5. Line 171 represents the feed of material upwardly into the lower part of the rotor, and line 172 represents the continuous return of underflow material back into the rotor. This return circuit may include a vent box as previously described with reference to Figure 3. A regulated amount of first underflow material can be withdrawn as indicated by valve controlled line 173, and a regulated amount of wash can be introduced into the return circuit as indicated by valve controlled line 174. Line 176 represents the withdrawal of centrifugally separated overflow, and line 177 the drawoff of a second underflow, the latter being controlled by adjusting the setting of valve member 178.

By use of the machine illustrated in Figures 5 and 6, one may manually regulate the amount of material drawn off by way of the second underflow, and such regulation can be applied together with regulating the gravity of the return and the amount of underflow drawoff, to adjust the separating conditions and to control the nature of the various separated fractions.

By regulating the amount of wash introduced by way of line 174, and at the same time regulating the amount of material in the second underflow drawoff, one can for example maintain an upflow condition at the outer part of the centrifuge chamber, and a downflow condition in that part of the separating chamber extending inwardly from the region where the second underflow is being withdrawn. By upflow I have reference to use of a sufficient amount of wash in the underflow return circuit whereby the amount of wash introduced in this manner is in excess of the amount of water in the withdrawn starch underflow, thus causing a countercurrent flow of wash inwardly of the outer part of the separating chamber. In the region of the second underflow drawoff the upflow wash can be withdrawn leaving separating conditions for the remainder of the separating chamber such that there is no upflow or countercurrent flow of wash, but actually a downflow.

The centrifuge illustrated in Figures 7 and 8 is particularly adapted for machines of the larger sizes. It employs a rotor 184 which is attached to the vertical drive shaft 185, and is enclosed in the housing 186. The rotor can be made of two conical shaped sections 184a, 184b, which are secured together by the lock ring 187. The sleeves 188, 189, are disposed concentrically about the shaft 185, and serve to form a passage 190 for introducing feed material. The sleeve 189 is surrounded by the downwardly divergent sleeve 191 which forms a part of the rotor, and which directs the feed material downwardly and outwardly through the passage 192 and the annular orifice 193. Radially extending vanes 194 and 195 in the passage 192 impart rotary motion to the feed material before it is discharged through orifice 193, into the main centrifuge chamber 196.

The separating discs 197 are spaced outwardly from the sleeve member 191, thus providing space for the overflow discharge device 198 and the second underflow discharge device 199. These devices can be somewhat similar to the discharge devices 148 and 142 of Figure 5, and are formed to provide divergent diffuser passages 201 and 202.

The upper surface of the separating chamber 196 is defined by a conical shaped member 203, which extends over the discs 197, and is provided with an inner depending rim or flange 204. This flange forms a baffle extending downwardly and about the entrant end of the discharge device 198. A plurality of circumferentially spaced and radially extending vanes 206 are disposed in the space below the discharge device 198, and are surrounded by the separating discs 197. Intermediate the discharge devices 198, 199, there is a conical shaped dividing wall 207, which is likewise carried by member 203. In operation the outer peripheral portion of discharge device 198 is immersed in overflow material and overflow is caught up by this discharge device and delivered inwardly and upwardly into the annular chamber 208, from which it can be removed through suitable means. The partition member 207 operates within a closed recess 209 formed between the discharge devices 198, 199, and can be provided with vanes 211, 212, upon its upper and lower faces.

Immediately above the member 203, a series of circumferentially spaced and radially extending tubes 213 are provided, and these tubes are circumferentially spaced by suitable filler blocks. The outer ends of the tubes 213 communicate with an annular zone 214, which corresponds to the zone 46 of Figure 1. The inner ends of the tubes 213 deliver material to the annular space 216, from which it is removed by the discharge device 199. Second underflow material delivered inwardly and upwardly through the device 199 is received in the annular chamber 217, from which it can be removed through a suitable valve controlled pipe.

The first underflow occurs through the nozzles 218, which are mounted upon the periphery of the centrifuge rotor. This discharge passes through the annular throat 219, and is received in the annular volute 221. From this volute the bulk of the material is delivered through a return circuit back into the centrifuge rotor, while a part of the underflow is withdrawn. The return circuit includes the nozzle 222 through which the underflow material is delivered upwardly into the lower end of the centrifuge rotor. By virtue of impeller means formed in the lower end of the rotor, such returned material is delivered outwardly and introduced into the outer portion of the separating chamber 196. The impeller means includes the inclined vanes 223 which extend upwardly from the mounting ring 224, together with the radially extending vanes 225, 226, 227 and 228. The vanes 227, 228, are within a passage 229 formed between the rotor section 184b, and the inner liner member 231. At the outer periphery of the liner member 231 there is an annular orifice 232 through which all of the underflow material passes to merge with the material in the separating chamber.

A particular feature of the centrifuge illustrated in Figures 7 and 8 is that it makes possible use of separating discs of relatively large outside and inside diameters, and such as are desirable for centrifuges of the larger sizes. A further feature is that the overflow is removed by a discharge device operating within a zone which is generally surrounded by a portion of the discs. In general the discharge arrangement for both the overflow and the second underflow, greatly facilitates the control of these fractions, while at the same time enabling relatively sharp separation between the various components of the feed.

In some instances the centrifuge of Figures 7 and 8 can be advantageously used to facilitate the removal of relatively heavy solids such as may occasionally be associated with starch slurries. I have particular reference to such solids as sand or like solid impurities which tend to be present in starch slurries derived from potato culls. Also in the processing of cassava roots in the manufacture of tapioca starch, the cortical outer skin or layer breaks up into fine fragments when the roots are ground, and these fragments cannot be satisfactorily removed by fine screens of the order of 400 mesh. Also some corn and sorghum starch slurries may contain undesired solids which are heavier than the starch. By proper operation of the discharge valves from volutes 221, 217, and 208, the bulk of the starch can be drawn off by way of the second underflow discharge from volute 217, while another fraction or first underflow can be withdrawn through the underflow nozzles 218 which contains sand or the fragments of the cortical layer or other heavier solids, together with some of the starch of the feed. The heavier material can be drawn off from time to time as this material tends to accumulate in the underflow circuit. Also an underflow circuit containing material like sand or other heavier material can be passed through suitable supplemental separating means capable of removing the same. The drawoff established from the underflow circuit can be processed for the recovery of its starch content, or if desired it can be separately processed to provide an inferior grade of starch.

Assuming the handling of starch slurries of the type described above, containing sand, fragments of cortical skin, or other heavier material, it is possible to utilize two stage centrifugal treatment, the first stage being adjusted whereby the bulk of the starch is discharged into volute 221. The drawoff from the underflow circuit is then sent as a feed to the second centrifuge, which can be adjusted for drawoff of starch by way of volute 217, with the heavier material (e.g. sand, etc.) being in the underflow withdrawn from volute 221. Likewise it is possible to operate the two centrifuge stages with the first stage being adjusted for drawing off the bulk of the starch (free of sand, etc.) from volute 217, and with this material then being sent to the second stage for further centrifugal treatment.

In operating the machine of Figures 7 and 8, the underflow circuit may be heated to an undesirable elevated temperature due to continuous recirculation. In such event suitable heat exchange means can be provided for cooling the return circuit and to thereby avoid development of excessive temperatures.

The embodiment of the invention illustrated in Figures 9 to 11, inclusive, is featured by a return circuit in conjunction with the second underflow drawoff. Thus in this instance the rotor 233 is provided with peripheral underflow discharge nozzles 234, which discharge material through the restricted throat 235 (see U.S. Patent 2,668,658) and into the volute 236 formed in the outer housing 237. The return circuit connected to the volute 236 delivers underflow material to the valve structure 238, which includes the adjustable valve member 239, and the valve orifice 240. Material discharged from the valve orifice 240 is received within the lower impeller portion 241 of the rotor, and from thence is delivered outwardly through the tubes 241a, into the annular zone 242 within the separating chamber 243. Preferably the tubes are arranged to discharge intermediate the circumferentially spaced nozzles 234. The return circuit also includes means for introducing wash water into the material being returned to the rotor, and a valve controlled drawoff pipe for removing underflow material from the system.

A structure 244 is mounted upon the housing, and is provided with partitions to form a plurality of compartments as shown in Figure 11. One compartment 245 serves to receive feed material from the supply pipe 248. The shaft 249 of the rotor is surrounded by the concentric sleeves 251 and 252, and the space between these sleeves is divided into two downwardly extending passages, by the vertical partitions or ribs 253, 254. The passage 256 communicates with the inlet chamber 245, and delivers feed material into the rotor space or feed well 257. From thence the feed material passes outwardly through the radially extending passages 258, into the main centrifuge chamber 243. The separating discs 259 surround the upwardly convergent annular member 261, and at the upper end of this member passages 262 deliver overflow into the annular rotor space 263. An annular discharge device 264, similar to the discharge devices described with reference to Figures 7 and 8, is disposed within the annular space 263, and serves to deliver the overflow material upwardly to the duct 266 (Figure 10) into the compartment space 267. From thence it is removed through the pipe 268. Circumferentially spaced tubes 269 are provided, corresponding to the tubes 43 of Figure 1, and serving to remove material from the annular space 271 of the centrifuge chamber. The upper ends of tubes 269 serve to deliver material into the annular chamber 272, formed in the upper end of the rotor. Another annular discharge device 273, similar to device 264, is disposed within the chamber 272, and serves to deliver material through the duct 274 into the compartment space 275. From thence material can be withdrawn through the pipe 276 (Figure 11). Compartment 275 also communicates through valve seat 277 with space 275 and a duct 278, which delivers material back into the centrifuge rotor. This is one of the ducts or passages formed between the sleeves 251 and 252, and therefore material returned in this manner is merged with the feed material in the well space 257. The valve seat 277 cooperates with the adjustable valve member 279, whereby the amount of material returned to the rotor can be adjusted.

The control valves 239 and 279 in Fig. 9 may be manipulated for individually regulating the rate of return flow of the respective underflow materials whereby the respective concentrations thereof are adjusted to provide a differential between these concentration adapted to induce optimum separation within the rotor of the respective underflow materials from each other.

As is apparent from Figures 9 and 10, the discharge devices 264 and 273 can be mounted upon the overlying compartmented structure 244, and the sleeve 252 can depend from and be formed as a part of the discharge device 264.

The embodiment of the invention illustrated in Figures 9 to 11, inclusive, has a number of inherent advantages. Controllable amounts of the second underflow can be continuously returned into the centrifuge rotor for retreatment, thus making possible a control with respect to the sharpness of separation between components removed in the three withdrawn fractions (i.e. the two underflows and the overflow). Furthermore by adjusting the amount of returned material it is possible to adjust the gravity of the second underflow in accordance with the requirements of a particular system in which the centrifuge is used. Another advantage is the fact that when a substantial part of the second underflow is returned, the amount of material flowing through the tubes 269 is greatly increased. This has the effect of increasing the flow velocity through these tubes, with the result that there is less tendency toward clogging.

In operating the machine of Figures 9 to 11, inclusive, wash water can be introduced into the return circuit for the first underflow, the same as previously described. By controlling the amount of wash water so introduced, a condition can be maintained in which there is an upflow between the first and the second underflow drawoffs, and a downflow between the second underflow and the overflow. In other words, wash water introduced into the main return circuit is caused to merge with material flowing through the tubes 269, and is eventually withdrawn in the second underflow drawoff. This causes a displacement action which may serve to displace solubles and solids in colloidal solution from solids removed in both the two underflows.

The centrifuge shown in Figures 9 to 11, can be used in a wide variety of industrial processing operations. In the construction illustrated the housing is provided with spaces 281, 282, through which cooling or heating fluid can be circulated to carry out separating operations under certain predetermined temperature requirements.

The embodiment illustrated in Figure 12 differs from that of Figures 9 to 11, inclusive, particularly in that the second underflow is returned within the rotor. In this instance the underflow nozzles 287 on the periphery of the rotor 288, are shown discharging into a volute 289 which is formed as a part of the housing 291. The volute is shown including a lining 292, and an annular baffle 293 to deflect the discharged material through the downwardly and inwardly curved volute passage 294. The lining and the deflector 293 can be formed of suitable resilient synthetic rubber. A pipe connection 296 is shown for withdrawing underflow material. The rotor is provided with a lower impeller 297, similar to the impeller of Figure 9, and which returns second underflow material through the radially extending passages 298, into the main centrifuge chamber 299. The main centrifuge chamber in this instance is also shown provided with a hopper liner 303. The upwardly convergent annular member 304 serves to mount the separating discs 306, and is carried by the shaft 307. Tubes 308 are provided, corresponding to the tubes 269 of Figure 9, and serve to deliver a second underflow into the annular space 309. An annular discharge device 311, corresponding to the device 273 of Figure 9, is disposed within a space 309, and serves to deliver the second underflow through the duct 312, into the upper second underflow compartment 313. From this compartment the second underflow is withdrawn through a valve controlled pipe. One or more passages 314 communicate with the discharge device 311, and serve to return a part of the second underflow downwardly into the inner space 316, where it merges with the feed material. Passage 314 preferably is constructed to provide a predetermined amount of choking to thereby control the amount of intermediate underflow returned into the rotor.

The overflow passes to an annular space 317, within which the discharge device 318 is disposed. This device serves to deliver overflow upwardly to a compartment (not shown), corresponding to the overflow compartment of Figure 9.

The embodiment of Figure 12 can be employed by the separation and removal of a relatively coarse material in the second underflow. For example, it can be used for the separation and removal of germs from a wet feed containing starch, gluten, germs and fibrous material. Internal recirculation as incorporated in Figure 12 makes possible the return of a relatively large amount of the second underflow with minimum power consumption.

Figure 13 shows an embodiment somewhat similar to Figures 9 and 10, but returned second underflow material in this instance is introduced into the return circuit for the first underflow. Thus the rotor 321 is provided with tubes or passages 322 for the second underflow, and such material is received by the discharge device 323. From device 323 it is delivered downwardly through passage 324, well 326, and passages 327 to the lower rotor impeller 328. Thus the second underflow is merged with the first underflow material being returned to the rotor by the impeller 328. In this embodiment overflow is received by the device 329 and delivered to an overflow compartment.

I claim:

1. In a centrifuge machine, a rotor having a separating chamber, means for supplying feed material to the rotor, means for discharging centrifugally separated overflow material from the rotor, means including discharge nozzles mounted upon the periphery of the rotor for the discharge of a centrifugally separated first underflow, means forming a return circuit for continuously returning such centrifugally separated underflow material back into the rotor, means for discharging a second centrifugally separated underflow material from the rotor, and means including a return path located within the rotor for continuously returning said second underflow material back into the separating chamber of the rotor.

2. In a centrifuge machine, a rotor having a separating chamber, means for supplying feed material to the rotor, means for discharging centrifugally separated overflow material from the rotor, means including discharge nozzles mounted upon the periphery of the rotor for the discharge of a centrifugally separated first underflow, means forming a return circuit for continuously returning such centrifugally separated first underflow material back into the rotor, means for discharging a second centrifugally separated underflow material from the rotor including circumferentially spaced tubes carried by the rotor and having their outer ends communicating with the separating chamber in an annular region located inwardly of said discharge nozzles, said tubes forming passages of limited and substantially uniform cross-section flow area, and means including a return path located within the rotor for continuously returning second underflow material back into the separating chamber of the rotor.

3. In a centrifuge machine, a rotor having a separating chamber, means for supplying feed material to the rotor, means for discharging centrifugally separated overflow from the rotor, discharge nozzles mounted upon the periphery of the rotor for the discharge of a centrifugally separated first underflow, means forming a return circuit for continuously returning such centrifugally separated first underflow material back into the rotor, means for discharging a second centrifugally separated underflow material from the rotor including circumferentially spaced tubes carried by the rotor and having their outer ends communicating with the separating chamber in an annular region located inwardly of said discharge nozzles, said tubes forming passages of limited and substantially uniform cross-sectional flow area, and means for continuously returning second underflow material back into the separating chamber of the rotor.

4. A machine as in claim 3, in which said last named means includes a return path external of the machine.

5. In a centrifuge machine, a rotor having a separating chamber adapted to receive feed material, discharge nozzles mounted upon the periphery of the rotor for the discharge of a centrifugally separated first underflow, a structure mounted above the rotor and having compartments for receiving feed material, for receiving a centrifugally separated overflow, and for receiving a second underflow, means for discharging second centrifugally separated underflow material from the rotor including circumferentially spaced tubes carried by the rotor and having their outer ends communicating with the separating chamber in an annular region located inwardly of said discharge nozzles, said tubes forming passages of limited and substantially uniform cross-sectional flow area, means carried by the structure and extending into the rotor for delivering feed material into the separating chamber, first transfer means carried by the structure and extending into the rotor for receiving overflow material, and second transfer means carried by the structure and extending into the rotor for receiving second underflow material from said tubes.

6. In a centrifuge machine, a rotor with means for supplying feed material to the rotor, said rotor having conically shaped end portions with their wide ends adjacent to each other to constitute a separating chamber, and also having discharge nozzles mounted upon the periphery of the rotor intermediate said conical end portions for the discharge of a centrifugally separated first underflow, one of said end portions having divergent internal return conduit means adjacent to the wall of the one conical end portion of the rotor and arranged around the rotor axis and terminating in an annular region located inwardly of said discharge nozzles, means forming a return circuit for continuously returning such centrifugally separated first underflow material back into said divergent return conduit means in the rotor, means for discharging a second centrifugally separated underflow material from the rotor, including circumferentially spaced convergent tubes internally adjacent to the wall of the other conical end portion of the rotor with their outer ends communicating with said separating chamber in an annular region located inwardly of said discharge nozzles, said tubes forming passages of limited and substantially uniform cross-sectional flow area, and additional return means for continuously returning second underflow material back into the separating chamber of the rotor.

7. The centrifuge machine according to claim 6, with the addition that said rotor comprises centrally disposed annular induction conduit means extending from the inlet end of the rotor to an annular region located inwardly from said internal divergent return conduit means.

8. The centrifuge machine according to claim 6, wherein said one conical end portion of the rotor provides a receiving chamber for returning first underflow communicating with said divergent return conduit means, with the addition that said rotor comprises induction conduit means providing communication between said additional return means and said receiving chamber so that second underflow material passing through said induction conduit means mixes in said receiving chamber with first underflow material.

9. The centrifuge machine according to claim 6, wherein the inlet ends of said convergent tubes are located in an annular region inwardly from the first mentioned annular region.

10. In a centrifuge machine, a rotor with means for supplying feed material thereto, having substantially conically shaped end portions with their wide ends adjacent to each other to constitute a separating chamber, and having discharge nozzles mounted upon the periphery of the rotor intermediate said conical end portions for the discharge of a centrifugally separated first underflow, one of said end portions having divergent internal return conduit means adjacent to the wall thereof and arranged around the rotor axis and terminating in an annular region located inwardly of said discharge nozzles, a stationary structure mounted above the rotor and having compartments for receiving feed material, for receiving a centrifugally separated overflow, and for receiving a second underflow, means for discharging a second centrifugally separated underflow material from the rotor including circumferentially spaced convergent tubes internally adjacent to the wall of the other conical end portion of the rotor with their outer ends communicating with said separating chamber in an annular region located inwardly of said discharge nozzles, said tubes forming passages of limited and substantially uniform cross-sectional flow area, means carried by said stationary structure and extending into the rotor for delivering feed material into the separating chamber, first transfer means carried by the structure and extending into the rotor for receiving overflow material, and second transfer means carried by the structure and extending into the rotor for receiving second underflow material from said tubes.

11. The centrifuge machine according to claim 10, wherein the inlet ends of said tubes are located in an annular region inwardly from the first mentioned annular region.

12. The centrifuge according to claim 10, with the addition that said rotor comprises centrally disposed annular induction conduit means extending from the inlet end of the rotor to an annular region located inwardly from said internal divergent return conduit means.

13. The centrifuge according to claim 10, wherein said one conical end portion of the rotor provides a receiving chamber for returning first underflow and communicating with said divergent return conduit means, with the addition that said rotor comprises induction conduit means providing communication between said additional return means and said receiving chamber so that second underflow material passing through said induction conduit means mixes in said receiving chamber with first underflow material.

14. In a centrifuge machine, a rotor having a separating chamber, means for supplying feed material to the rotor, means for discharging centrifugally separated overflow material from the rotor, means including discharge nozzles mounted upon the periphery of the rotor for the discharge of a centrifugally separated first underflow, means forming a return circuit for continuously returning such centrifugally separated underflow material back into the rotor, means for discharging a second centrifugally separated underflow material from the rotor, means including a return path located within the rotor for continuously returning said second underflow material back into the separating chamber of the rotor, and control means for individually regulating the rate of return flow of the respective underflow materials.

References Cited in the file of this patent
UNITED STATES PATENTS

| | | |
|---|---|---|
| 2,179,941 | Lindgren | Nov. 14, 1939 |
| 2,313,541 | Flowers | Mar. 9, 1943 |
| 2,319,653 | Zachariassen | May 18, 1943 |
| 2,488,747 | Strezynski | Nov. 22, 1949 |
| 2,500,100 | Strezynski | Mar. 7, 1950 |
| 2,628,021 | Staaff | Feb. 10, 1953 |
| 2,636,670 | Aspergren | Apr. 28, 1953 |
| 2,668,658 | Peltzer | Feb. 9, 1954 |
| 2,779,536 | Pomeroy | Jan. 29, 1957 |